United States Patent [19]

De Clifford

[11] Patent Number: 4,458,621

[45] Date of Patent: Jul. 10, 1984

[54] FISHING VESSELS

[76] Inventor: Graham R. De Clifford, 28 Conn St., Ferntree Gully, Victoria 3156, Australia

[21] Appl. No.: 269,036
[22] PCT Filed: Sep. 15, 1980
[86] PCT No.: PCT/AU80/00068
  § 371 Date: May 14, 1981
  § 102(e) Date: May 13, 1981
[87] PCT Pub. No.: WO81/00664
  PCT Pub. Date: Mar. 19, 1981

[30] Foreign Application Priority Data

Sep. 14, 1979 [AU] Australia .............. PE0494

[51] Int. Cl.³ .................................... A01K 71/00
[52] U.S. Cl. .................................. 114/255; 43/6.5
[58] Field of Search ............... 114/255, 270, 240 C, 114/240 E, 241, 40–42, 260; 43/6.5, 4.5; 414/140, 145; 296/15

[56] References Cited

U.S. PATENT DOCUMENTS

| 478,579 | 7/1892 | Dunham | 114/255 |
|---|---|---|---|
| 1,138,541 | 5/1915 | Conekin | 114/255 |
| 1,464,623 | 8/1923 | Lybeck . | |
| 1,486,485 | 3/1924 | Frissell | 43/6.5 |
| 1,606,668 | 11/1926 | Rubach | 43/6.5 |
| 1,777,783 | 10/1930 | Burns et al. | 43/6.5 |
| 2,064,408 | 12/1936 | Blecker | 43/6.5 |
| 2,548,038 | 4/1951 | Moliskey | 43/6.5 |
| 2,651,874 | 9/1953 | Key . | |
| 3,768,193 | 10/1973 | London | 43/6.5 |
| 3,776,171 | 12/1973 | Sibthorpe | 114/241 |
| 3,786,592 | 1/1974 | Miller et al. . | |
| 4,086,717 | 5/1978 | Aucoin, Jr. et al. . | |

FOREIGN PATENT DOCUMENTS

| 3577678 | 11/1979 | Australia . | |
| 416627 | 7/1925 | Fed. Rep. of Germany . | |
| 500121 | 6/1930 | Fed. Rep. of Germany . | |
| 806758 | 10/1936 | France | 296/15 |
| 39401 | 4/1957 | Poland | 43/6.5 |
| 819865 | 9/1959 | United Kingdom . | |

Primary Examiner—Trygve M. Blix
Assistant Examiner—Stephen P. Avila
Attorney, Agent, or Firm—Andrus, Sceales, Starke & Sawall

[57] ABSTRACT

A marine life harvesting method and apparatus in which a vessel (10) has a marine life capturing device (12) consisting of telescopic booms (14, 16, 18) to which are attached a mesh or net (20). The capturing device (12) has an inlet orifice (74) and an outlet orifice (76) the outlet orifice communicating with a marine life harvesting device, which may be a passage (42) through the hull (40) of the vessel, marine life entering the inlet orifice as the vessel travels across the body of water, and being diverted by the capturing device (12) to flow from the outlet orifice (76). A conveyor (48) may be provided to remove marine life from the passage (42) to a processing station (52) and retractable grilles (44, 46) may be provided to control the flow of material through the passage.

9 Claims, 5 Drawing Figures

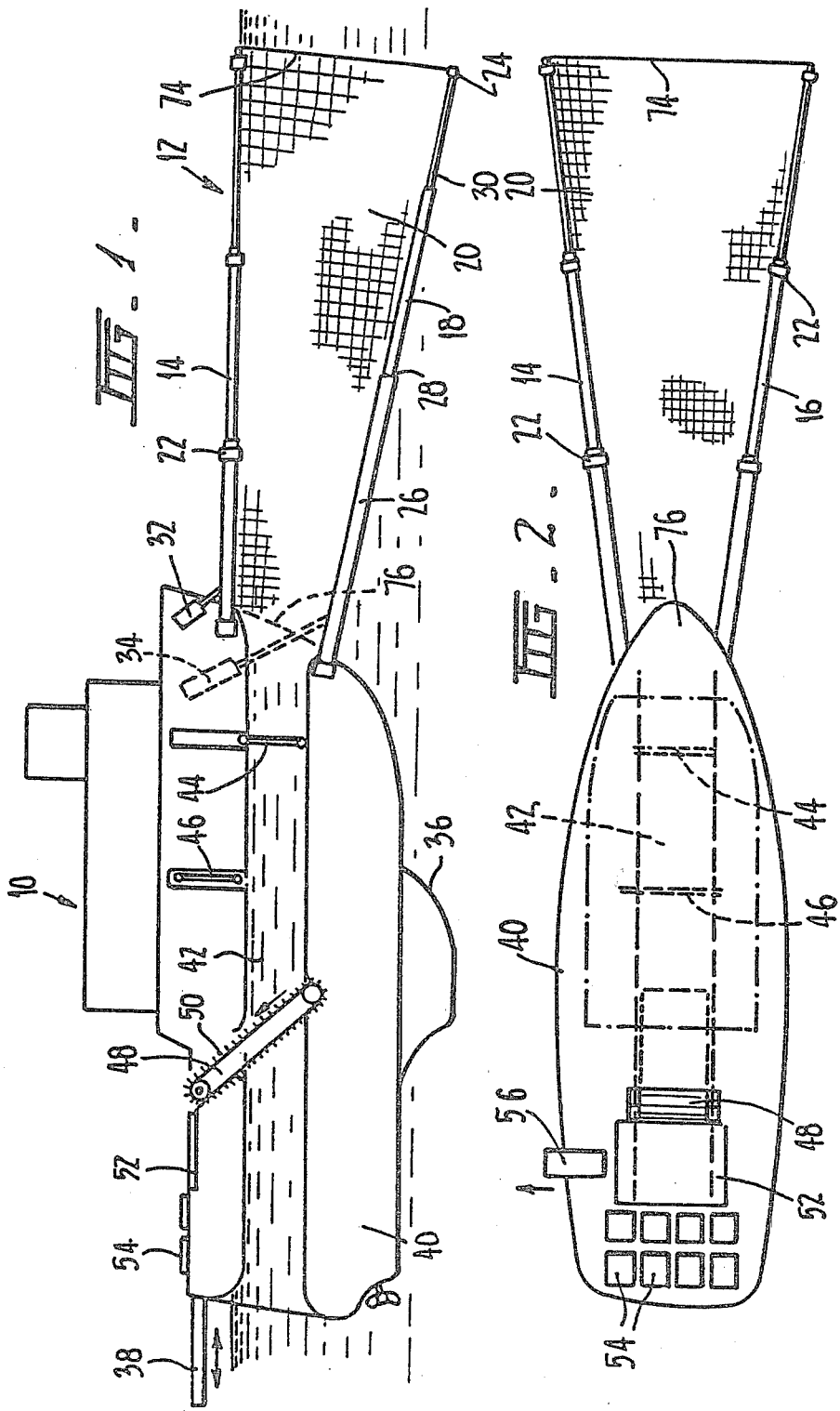

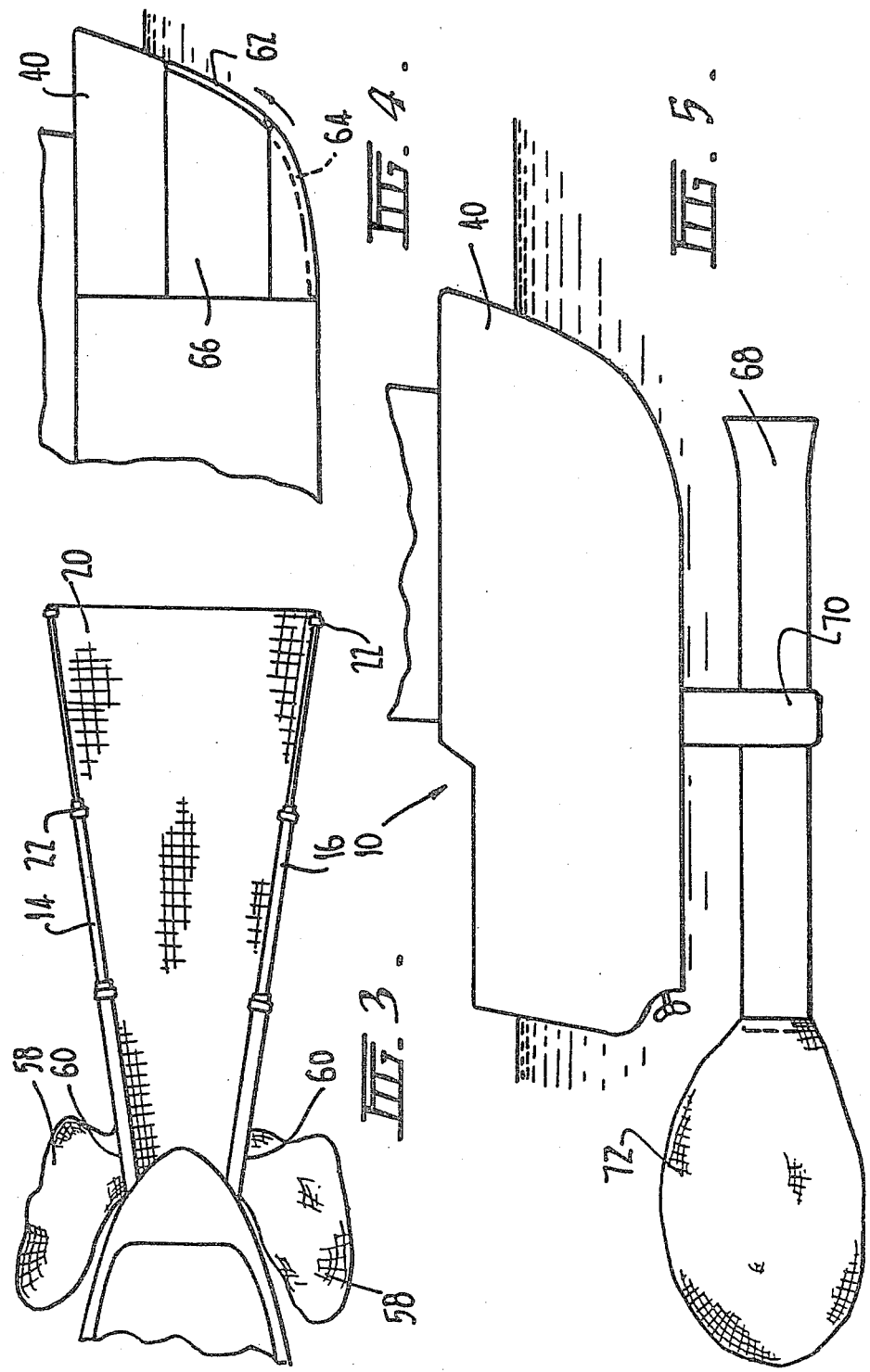

FISHING VESSELS

This invention relates to a method and apparatus for harvesting animal life from a body of water, and relates particularly to improvements in fishing vessels.

Large scale net fishing is practised today in much the same way as it has been for years, with the only technological improvements being in some of the equipment used. It is still a generally ineffective way in which to 'harvest' fish, as many fish escape from nets during the fishing operation, many fish are crushed, and many unwanted species of marine life are killed.

It is an object of this invention to provide improvements in fishing vessels, apparatus and methods which will assist fishing to become more efficient and cost effective.

Accordingly, the invention provides a method of harvesting material from a body of water, characterized in that said material is diverted from said body of water by capturing means (12) associated with a vessel (10), as said vessel travels relative to said body of water, said diverted material being subsequently processed.

The invention also provides apparatus for harvesting material from a body of water, characterized in that capturing means (12) are associated with a vessel (10), said capturing means (12) including a portion (74) allowing the material to enter the capturing means (12) when said vessel (10) is travelling relative to said body of water, said capturing means (12) being adapted to divert said material to a processing station.

Embodiments of the invention will be described in detail hereinafter, with reference to the accompanying drawings, in which:

FIG. 1 is a schematic side view of a vessel embodying one form of the invention;

FIG. 2 is a schematic plan view of the vessel of FIG. 1;

FIG. 3 is a schematic plan view of portion of a second embodiment;

FIG. 4 is a schematic side elevation on a third embodiment; and

FIG. 5 is a schematic side elevation of a fourth embodiment.

Dealing firstly with FIGS. 1 and 2, there is shown a vessel 10 having capturing means 12 secured thereto. The capturing means 12 consists of four telescopic booms, only three of which, 14, 16 and 18 are shown. The booms are pivotally connected to the hull 40 of the vessel, preferably to an area near the bows which has been strengthened with additional plating. The telescopic booms are arranged as shown in FIG. 1, with telescopic portions 26, 28 and 30.

The booms 14, 16, 18 are in this embodiment arranged in a truncated right pyramid orientation, and apart from being telescopic, are capable of being raised from, and lowered into a body of water by means such as the hydraulic means 32, 34. The top booms 14, 16 may be provided with floats 22 which enable them to be retained on or near the surface of the body of water. The booms are covered with a net mesh 20 to complete the capturing means. Open-weave interlaced wire material (known in Australia as cyclone wire) has been used in a prototype arrangement.

The capture structure 12 has a large open end 74 and a smaller open end 76 the uses of which will be described hereinafter. In the embodiment of FIGS. 1 and 2, the hull 40 of the vessel 10 has a pass 42 extending therethrough, from stem to stern. Two grilles 44, 46 may be provided such that they may be moved from a position where they are located across the passage (as in the case of 44) to a position where they are not obstructing the passage.

The vessel is also provided with a marine life conveyor means 48, which includes an endless conveyor 50 provided with marine life engaging portions of a flexible nature. The upper end of conveyor means 48 is located near a processing station 52 which may be in the form of a sorting area. Marine life sorted at the station 52 may be packaged at a packaging station 54 which may take any suitable form. A second conveyor means 56 operates to return unwanted material to the body of water, laterally with regard to the directions of travel of the vessel.

To balance the vessel when the capturing means 12 is in the water, a weight cage 38 may be provided, movable between an extended position, when the means is in the body of water, and a retracted position within the hull 40, when the means is raised from the body of water. In addition, a retractable keel 36 may be used to balance the vessel when the means 12 is in a raised position. Finally, sensing means 24 may be associated with the lower booms of the capturing means 12 so that obstructions ahead of the means may be located, and the booms raised to clear the obstructions.

In use, the capturing means is positioned as shown in FIGS. 1 and 2, except that the keel 36 is retracted. The vessel is caused to move forward, and as a result, water will flow through passage 42 from bow to stern. Water will pass through the net or mesh 20, but any marine life larger than the mesh size will be diverted into passage 42. Marine life, if allowed to flow past grilles 44, 46, will impinge on conveyor belt 50, moving in the direction of the arrow in FIG. 1. Conveyor belt 50 is preferably formed of an open weave material to alow the passage of water therethrough. The marine life will be transported by conveyor means 48 to the processing station 52, where it may be sorted, manually or automatically. Selected marine life would be packaged at packaging station 54, and most probably would be frozen forthwith. Unwanted and/or undersized would be placed on second conveyor means 56 and ejected laterally back into the body of water.

Other forms of harvesting may be used. A mesh cage may be dropped into passage 42, allowed to fill with marine life, and then be removed to a sorting area, to a freezing area, or may be jettisoned, with floats, back into the body of water, or are attached to marker buoys, to be picked up by another ship.

In this embodiment, grille 44 is formed from a 'fine' mesh of a size comparable with the mesh 20 of capturing means 12. Grille 46 is provided with a much coarser mesh. In the event that a large squid, shark, dolphin or the like is captured, grille 46 would be lowered, and conveyor means 48 would be raised so that it no longer obstructed passage 42. Once the particular marine life sample was retained behind grille 46, grille 44 would be lowered, preventing ingress of further marine life into the area between grilles 44 and 46. Such marine life in the area prior to the lowering of grille 44 are able to exit through grille 46. Grille 46 is then raised, and the particular marine life sample is allowed to pass through the remainder of passage 42 to return to the body of water.

A water speed of 9 knots is considered most efficient for the marine life harvesting operation. The open construction of the mesh 20 provides for minimum drag when travelling at such a speed. Aircraft or other fish locating means may be used to spot schools of fish, and the vessel could steam back and forth through the school, harvesting the fish most efficiently.

In FIG. 3, the passage 42 is omitted or not used, and orifices 60 are provided in mesh 20 on either side of the bow, near the bow. Nets 58, possibly of a conventional material, are located to catch marine life diverted by capturing means 12, and the nets may be hauled up when full, to remove the marine life in a conventional manner, or by using some of the processing equipment described in relation to FIGS. 1 AND 2.

In FIG. 4, where for convenience the capturing means 12 is not shown, a hollow compartment 66 in the bows region of the vessel is provided. The compartment has an orifice 62 communicating with opening 76 in means 12, and a door 64 adapted to close the compartment. In use, door 64 would be opened, to allow water and captured marine life into the compartment. At a predetermined time, door 64 is closed, and at least some of the water pumped out, facilitating the harvesting of marine life, possibly using the equipment described in relation to FIGS. 1 and 2.

Finally, FIG. 5 shows an embodiment where passage 42 is an external frame 68, attached by an intermediate member 70 to hull 40. Again, the capturing means 12 is not shown. The passage may be provided with all the equipment described in relation to passage 42 of FIGS. 1 and 2, or it may lead to a net 72, which could be removed and replaced, the contents being removed in a conventional manner. The passage 42 could be located in one of two or more hulls, or located between hulls, of a vessel.

It should be noted that features of the vessel, the capturing means and the harvesting means, are largely well known, and require no further explanation. It is envisaged that hydraulics will be used to operate such features as the telescoping booms, the raising and lowering of the booms, and the grilles, but other forms of motive power may be used. The booms, for example may be positioned using a crane, and there may be crossmembers between adjacent booms.

It will be appreciated that the method and apparatus described herein provide an efficient and rapid means of harvesting marine life, with a minimum of wastage and a maximum of conservation.

I claim:

1. A fishing vessel having a continuous, substantially straight, underwater passage therethrough from bow to stern entirely below the waterline of the vessel, said passage having an entrance arranged so that water flows through said passage when the vessel is under way, capturing means associated with the vessel and arranged to direct fish into said entrance, and conveyor means located across substantially the entire width and height of said passage allowing water to pass through said conveyor means while conveying fish in said passage up said conveyor means to a processing station.

2. A fishing vessel as claimed in claim 1 wherein said conveyor means comprises a mechanical conveyor belt arranged so that the upwardly moving portion of the belt is located on the upstream side of the conveyor in the passage and is directly impinged upon by fish moving through said passage.

3. A fishing vessel as claimed in claim 1 wherein said conveyor means is retractable from said passage.

4. A fishing vessel as claimed in claim 1 wherein at least one retractable grille is provided in said passage upstream of said conveyor means, arranged to be advanced or retracted so as to cover or uncover respectively the cross-section of the passage.

5. A fishing vessel as claimed in claim 4 wherein two said retractable grilles are provided, there being a first, fine mesh retractable grille adapted to inhibit or prevent the movement of catch size fish through the grille, and a second said grille located downstream of the first said grille and upstream of said conveyor so as to be between the first said grille and the conveyor, the second said grille being a larger mesh grille adapted to permit the passage of catch sized fish therethrough but to inhibit or prevent the passage of larger marine creatures.

6. A fishing vessel as claimed in claim 1 wherein said capturing means comprises a funnel-shaped net radiating outwardly and forwardly from the entrance to said passage.

7. A fishing vessel as claimed in claim 6 wherein said net is approximately rectangular in cross-section and is supported by four telescopic booms extending forwardly from the hull or superstructure of the fishing vessel.

8. A fishing vessel as claimed in claim 1 provided with movable ballast arranged to compensate for the weight and drag of said capturing means.

9. A fishing vessel as claimed in claim 1 provided with a movable or retractable keel arranged to balance the vessel against the drag and weight of the capturing means.

* * * * *